United States Patent
Sendowski

(10) Patent No.: US 6,225,896 B1
(45) Date of Patent: May 1, 2001

(54) PANIC STOP, DECELERATION WARNING SYSTEM

(76) Inventor: Ilan Sendowski, 19108 Lull St., Reseda, CA (US) 91335

( * ) Notice: Subject to any disclaimer, the term of this patent is extended or adjusted under 35 U.S.C. 154(b) by 0 days.

(21) Appl. No.: 09/496,977

(22) Filed: Feb. 2, 2000

(51) Int. Cl.$^7$ ..................................................... B60Q 1/50
(52) U.S. Cl. ...................... 340/467; 340/479; 73/514.09; 200/61.47
(58) Field of Search .................................. 340/467, 479; 73/514.09; 200/61.47, 155, 156

(56) References Cited

U.S. PATENT DOCUMENTS

| | | | |
|---|---|---|---|
| 3,665,391 | * 5/1972 | Bumpous | 340/479 |
| 3,955,398 | * 5/1976 | Watson et al. | 200/61.47 |
| 4,320,384 | 3/1982 | Carlson | 340/467 |
| 4,600,913 | 7/1986 | Caine | 340/435 |
| 4,663,609 | 5/1987 | Rosario | 340/479 |
| 4,800,377 | 1/1989 | Slade | 340/466 |
| 4,833,469 | 5/1989 | David | 340/901 |
| 4,922,225 | * 5/1990 | Dankert | 340/467 |
| 5,017,904 | 5/1991 | Browne et al. | 340/479 |
| 5,150,008 | 9/1992 | Rakow | 340/479 |
| 5,594,416 | 1/1997 | Gerhaher | 340/467 |
| 5,786,752 | * 7/1998 | Bucalo et al. | 340/467 |
| 5,850,177 | * 12/1998 | Zimmerman | 340/479 |
| 6,020,814 | * 2/2000 | Robert | 340/467 |

* cited by examiner

Primary Examiner—Benjamin C. Lee
(74) Attorney, Agent, or Firm—Ilan Sendowski

(57) ABSTRACT

An emergency-stop warning unit and a method for the control thereof, serve for reducing the severity and chance of rear-end collisions. The invention utilizes a deceleration or collision impact sensor and vehicle electric power-source to turn on the white Reverse-Light upon high deceleration of the vehicle, providing the follow-on vehicle with an early warning of an emergency stop or actual collision impact. The Reverse-Light, in an unexpected circumstance, provides a self-explanatory, sharp, clear and timely warning to the following driver to initiate a defensive action.

8 Claims, 4 Drawing Sheets

DECELERATION SENSOR USING CONDUCTIVE LIQUID

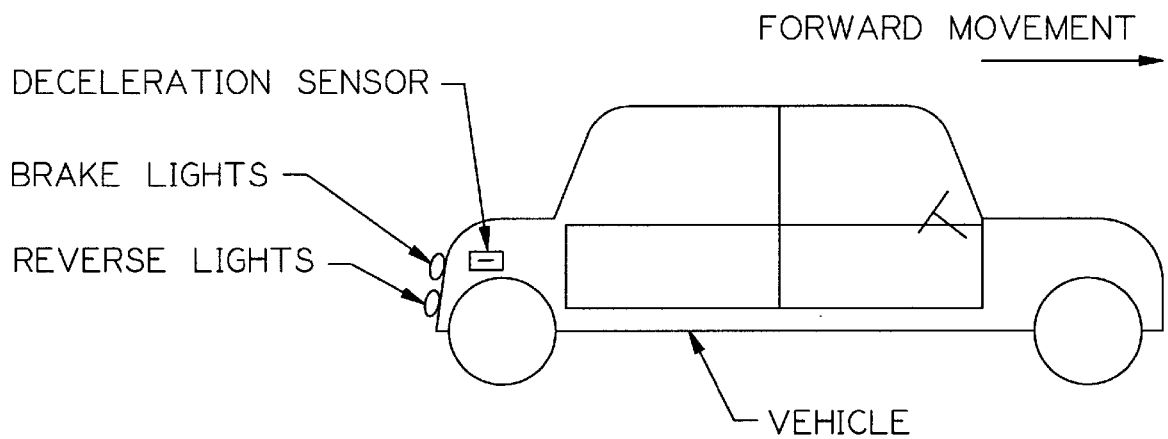
FIG 1.   GENERAL VIEW OF VEHICLE AND ELEMENTS
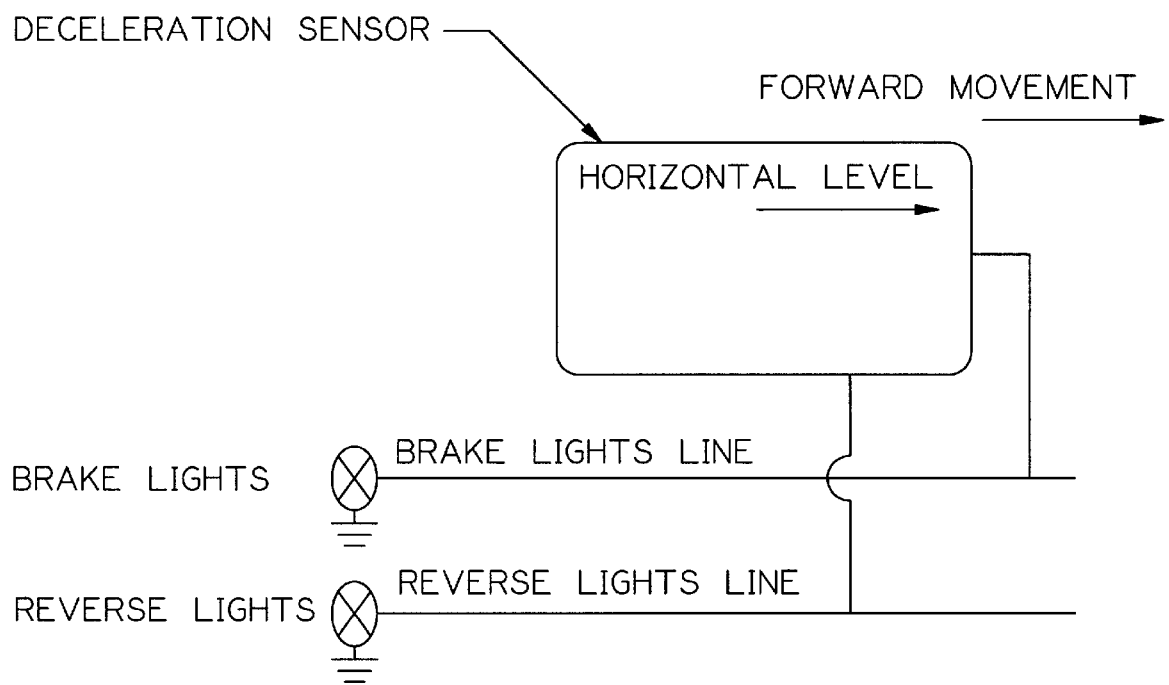
FIG 2.   DECELERATION SENSOR CONNECTIONS

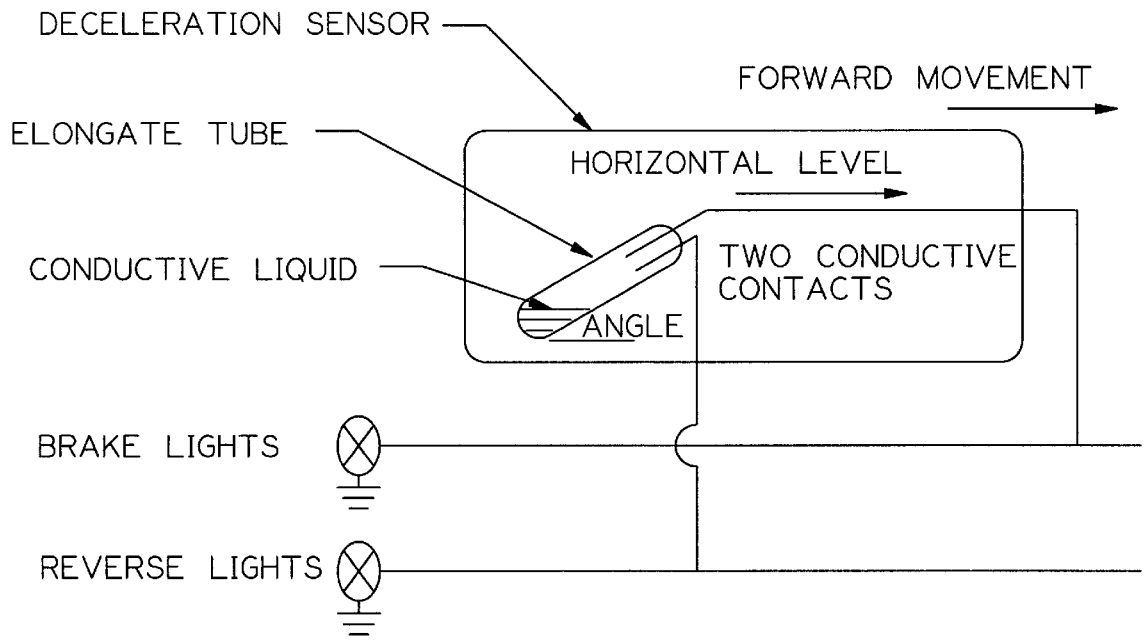
FIG 3. DECELERATION SENSOR USING CONDUCTIVE LIQUID
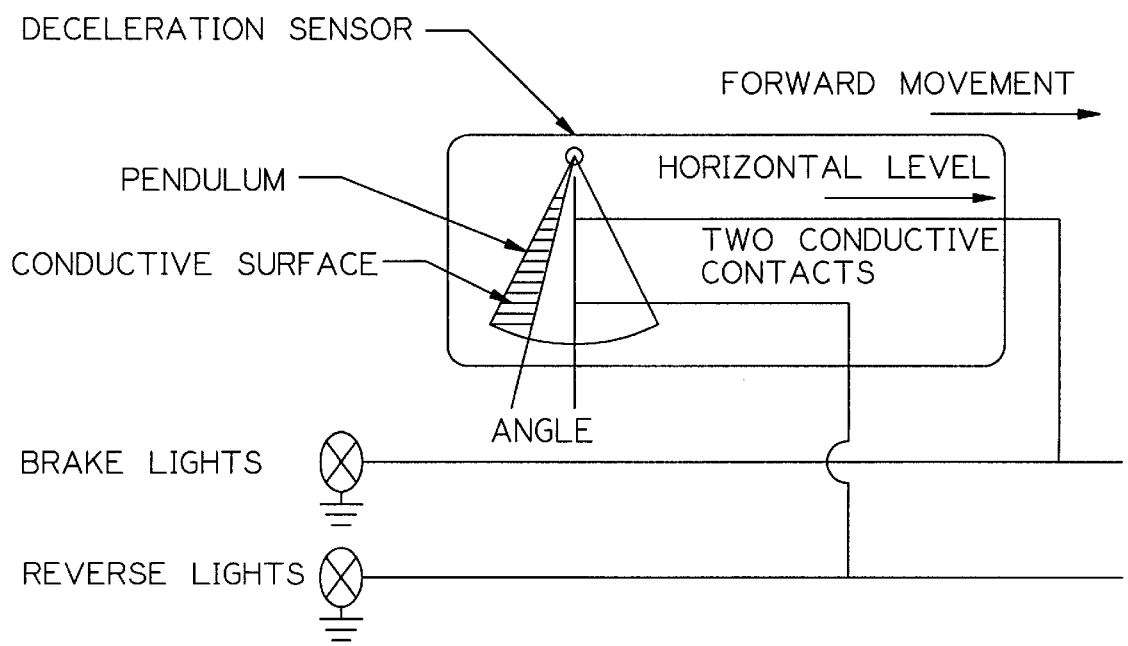
FIG 4. DECELERATION SENSOR USING A CONDUCTIVE PENDULUM

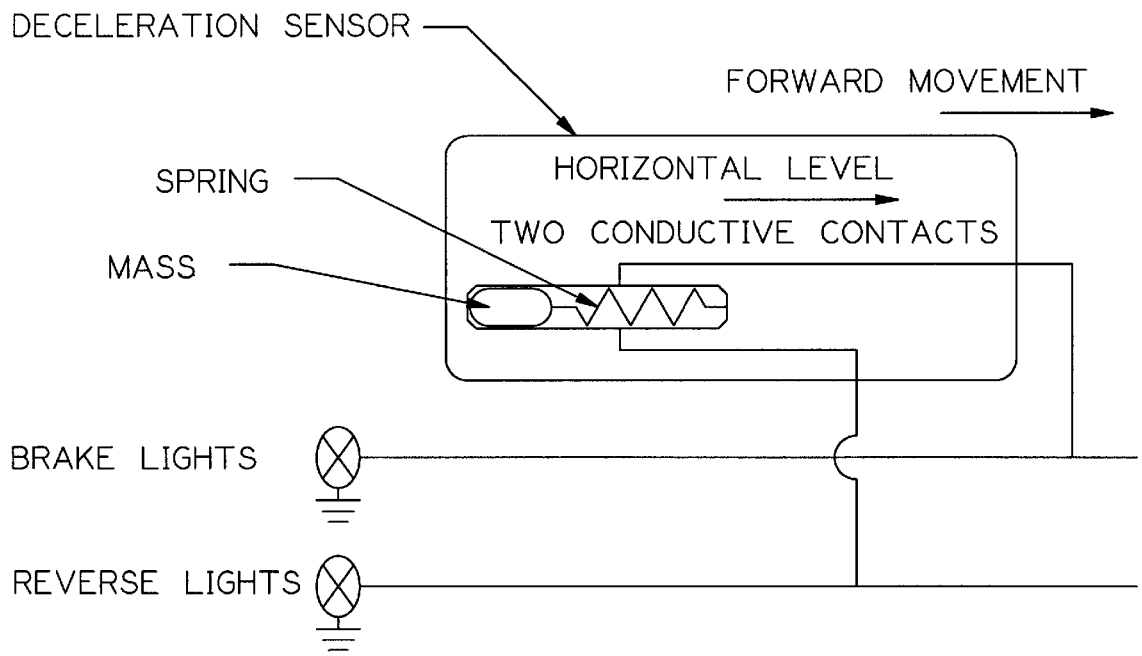
FIG 5. DECELERATION SENSOR USING A MASS AND A SPRING
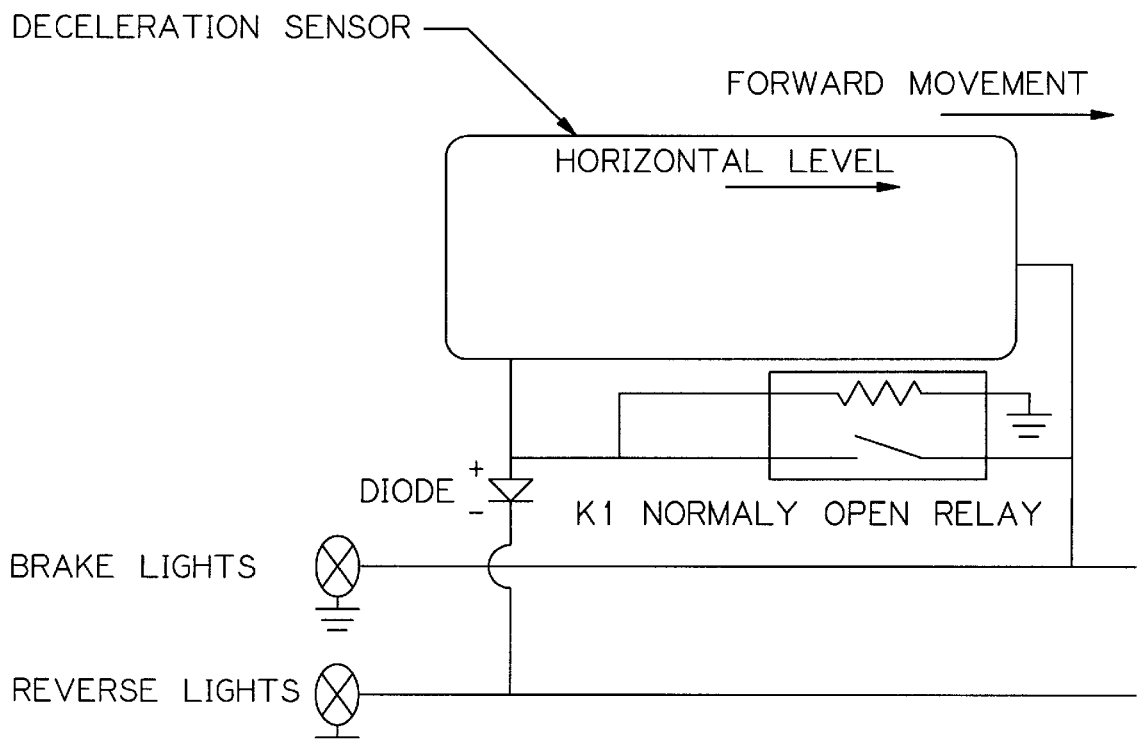
FIG 6. DECELERATION LATCHING CIRCUIT

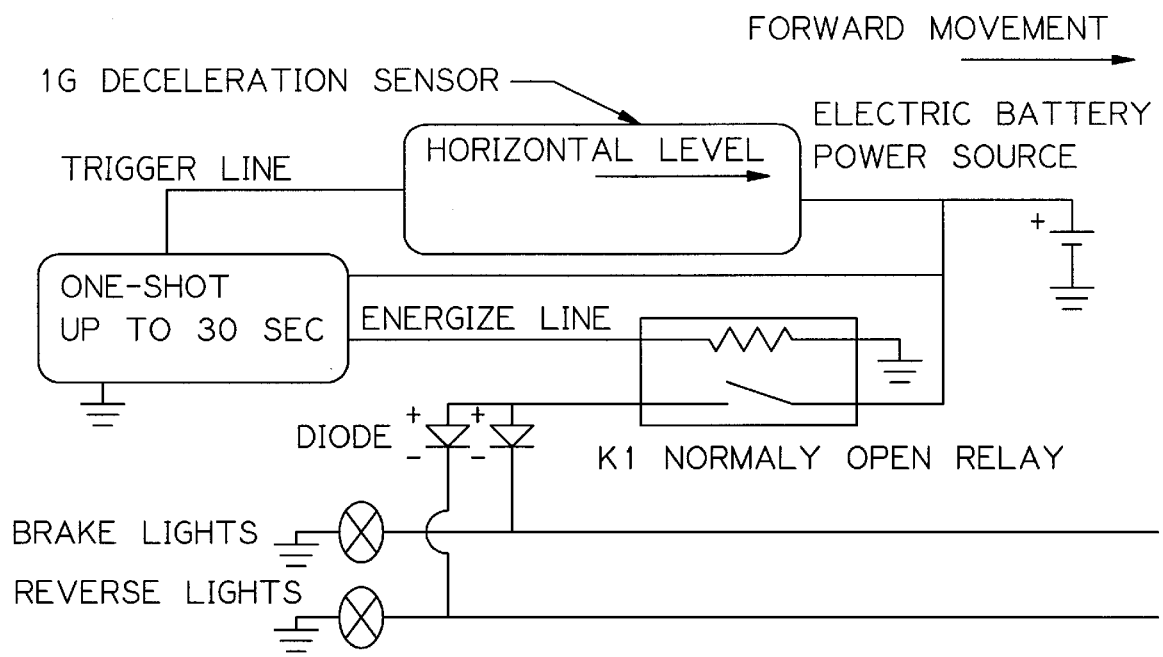
FIG 7. 1G DECELERATION SENSOR WITH 2 DIODES ISOLATED OUTPUT
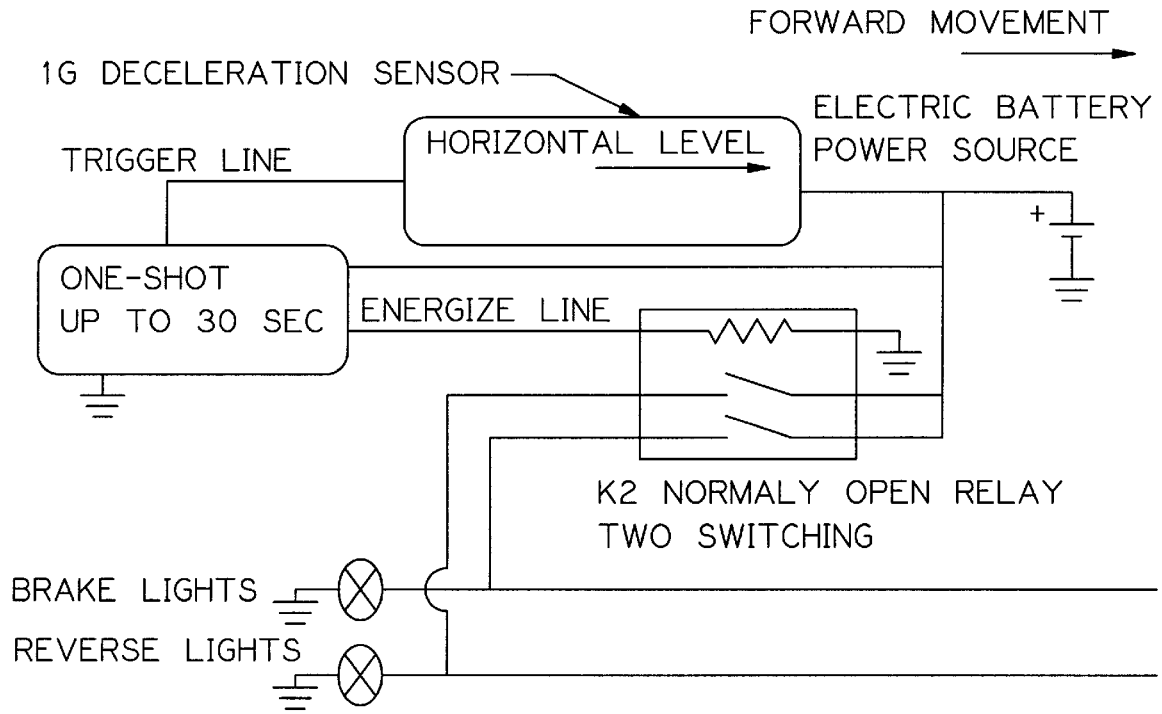
FIG 8. 1G DECELERATION SENSOR WITH 2 SWITCHING RELAY ISOLATED OUTPUT

PANIC STOP, DECELERATION WARNING SYSTEM

RELATED APPLICATIONS

NA

FEDERAL SPONSORED

NA

MICOFICHE APPENDIX

NA

BACKGROUND OF THE INVENTION

In many rear-end collisions between vehicles, an extra distance of a fraction of a yard could have prevented the collision impact and the injury. This extra distance is lost at the beginning of the emergency stop, when the following driver fails to recognize the severity of the deceleration of the vehicle ahead. The following driver is wasting a precious second before initiating the full emergency braking capability of the vehicle. An early, clear, specific, and instinctively understood warning signal, based on the actual deceleration of the vehicle utilizing the Brake-Lights in combination with the Reverse-Lights, provides such a warning.

BRIEF SUMMARY OF THE INVENTION

An emergency-stop warning unit and a method for the control thereof, serve for reducing the severity and chance of rear-end collisions. The invention utilizes a deceleration or collision impact sensor, and a vehicle electric power-source, to turn on the white Reverse-Light upon high deceleration of the vehicle, for a period sufficient to put the following driver on notice of an emergency condition.

DESCRIPTION OF THE DRAWINGS

FIG. 1. General view of a vehicle and the location of the major elements.

FIG. 2. Deceleration Sensor connection to the Brake-Lights line and Reverse-Lights line.

FIG. 3. Deceleration Sensor, using a conductive liquid in an elongated sealed hollowed tube with two conductive contacts.

FIG. 4. Deceleration Sensor, using a pendulum with a conductive surface and two conductive brushes.

FIG. 5. Deceleration Sensor, using a mass and a spring with a conductive surface on the mass and two conductive brushes.

FIG. 6. Deceleration Latching circuit, to hold the warning signal after termination of the deceleration until power is removed from the Brake-Lights.

FIG. 7. 1 G Deceleration sensor One-Shot circuit, to hold the warning signal after collision impact for a given selectable time, using a single switching relay and 2 diodes.

FIG. 8. 1 G Deceleration sensor One-Shot circuit, to hold the warning signal after collision impact for a given selectable time, using dual switching relay.

DETAILED DESCRIPTION

An emergency-stop warning unit, and a method for the control thereof, serve for reducing the severity and chance of rear-end collisions. The invention utilizes a deceleration or collision impact sensor and a vehicle electric power-source, to turn on the white Reverse-Light upon high deceleration of the vehicle, for a period sufficient to put the following driver on a notice of an emergency condition.

An electric line is connected to the Brake-Light line to provide electric power when a lead vehicle uses the brakes. When the lead vehicle is subjected to a high deceleration above 0.2 G ( 0.2 of Gravity, approximately 2 meters per second square) as result of an emergency-stop or a collision impact with another object, a deceleration sensor shorts the Brake-Lights power to the Reverse-Lights line. The combination of the Brake-Lights and the Reverse-Lights indicates to a following driver that the vehicle ahead is in a process of an extreme deceleration that requires a defensive action such as changing lane, or stopping his or her vehicle as rapidly as possible.

The deceleration sensor may be made of a sealed hollowed tube with a conductive liquid inside. The tube is positioned in an angle pointing in the direction of the front end of a vehicle and in an 11 to 90 degrees above the horizontal level. (FIG. 3.) In normal inactive condition the conductive liquid will be at the bottom of the sealed hollowed tube. When the vehicle is subjected to deceleration, the liquid flows up the slope to the top end of the tube. At the top end of the tube there are two contacts that in a normal condition are isolated from one another. When the conductive liquid reaches the top end, it shorts the two contacts and creates a path from one contact to the other, and permits the flow of power from the Brake-Lights line, that is connected to one contact, to the other contact that is connected to the Reverse-Lights line. If the deceleration is above the minimum deceleration required to activate the deceleration sensor, the liquid is captured at the sealed top and the sensor remains engaged. When the deceleration declines below 0.2 G, the liquid slides back to the bottom, and the contact opens between the Reverse-Lights and the Brake-Lights.

The same deceleration sensor can be made by using a pendulum or a mass and a spring that measures deceleration of 0.2 G or above. Another way is to use the oil pressure in the braking system is above a given pressure as indication of deceleration.

The deceleration sensor is housed in a package or a case. A marking on the package or the case indicates the way to install the deceleration sensor. The marking includes an arrow that should point to the front end of the vehicle when fully installed, and a line indicating the horizontal level. The package or the case is mounted in the vehicle with the horizontal level mark on the deceleration sensor package aligns with the vehicle horizontal level. When installed, the sensor deceleration measuring capability is pointing forward toward the front end of the vehicle. The deceleration sensor is secured to the vehicle by a magnet, screws or adhesive material.

The combination of Reverse-Lights and Brake-Lights will demand the attention of a following driver to take the appropriate defensive action when the warning condition exists.

In the above configuration, once the lead vehicle is at deceleration below 0.2 G, the Reverse-Light is extinguished, and approaching vehicles are unaware that the vehicle ahead is actually at a full stop and not just applying the brakes. An extra latching circuit using a diode and a relay are used to sustain the warning signal, until the power to the Brake-Lights is removed. The diode is used to insure that only the power from the Brake-Lights line will latch the latching relay and be routed to the Reverse-Lights line and not the other way around.

In a different scenario after a collision impact, the lead driver might not have used the brakes or had removed his or her leg from the brake pedal accidentally and the special warning signal is extinguished. To avoid this possibility a second deceleration sensor designed to detect deceleration above 1 G is connected to a one-shot pulse generator that maintains an engaged condition of up to 30 seconds after the one-shot is triggered. Deceleration sensor of 1 G is obtained when the angle of the sensor to the horizontal level is 45 degrees. The one-shot circuit turns on a relay that provides power to the Reverse-Light and the break light for the duration of the one-shot engaged period regardless if the driver ever applied the brakes, or remove the leg from the brake pedal. The line to the Reverse-Lights line, and the line to the Brake-Lights line, are routed via different switching, or are separated by two diodes. FIG. 7 and FIG. 8. The purpose of the two diodes or the separate switches is to prevent a permanent short between the Reverse-Lights line and the Brake-Lights line.

When the vehicle climbs or descents a steep grade, the deceleration sensor engages at a different deceleration value. Climbing, the sensor engages at higher value of deceleration, but it is easier to stop the vehicle going up the grade. Down the grade, the sensor engages at a lower value but this is proper, because the sensor becomes more sensitive and it is harder to stop going down the grade. On a bumpy road going down the grade, false alarms might be initiated. For such off-road conditions, increasing the angle up from the horizontal level can make a correction of the deceleration sensor, to insure proper operation.

A relay means an electrical mechanical relay or a solid state relay. G is the earth gravity as a measurement of deceleration or acceleration.

I claim:

1. An emergency deceleration warning apparatus utilizing a Reverse-Light in combination with a Brake-Light when a vehicle decelerates at a deceleration of 0.2 G or above, comprises:

an electric power-source with high voltage side and a low voltage side, for providing the electric power energy, connected to a deceleration sensor for detecting a deceleration above 0.2 G comprising of:

a package for holding a deceleration sensor circuit with forward and level markings;

a magnet or adhesive or a set of screws for connecting the package to a vehicle in a horizontal level condition;

a wire to connect to the electric power-source to the deceleration sensor circuit, for obtaining electric power to energize the deceleration sensor;

a wire to connect to the Reverse-Lights from the deceleration sensor circuit, for delivering the electric power to a set of warning lights visible to following vehicles that includes:

a set of Brake-Lights that indicates that the driver is applying the brakes, and a set of Reverse-Lights that indicates that the driver is using a reverse gear;

an elongated sealed hollowed tube with a top end and a bottom end, with a length of up to 10 centimeters, a conductive liquid inside the elongated sealed hollowed tube, resting at the bottom end; two permanent conductive contacts located at the top end, and such elongated sealed hollowed tube is positioned inside the package pointing to the front end of the vehicle in an angle of 11 to 90 degrees up from the horizontal level position, and upon deceleration the conductive liquid proceeds up a slope along the interior of the elongated sealed hollowed tube until the conductive liquid reaches the top end, and creates an electric contact between the two permanent located conductive contacts at the top end and engages the deceleration sensor circuit.

2. An emergency deceleration warning apparatus as in claim 1 where the electric power-source is an electric power line connected to the Brake-Lights line.

3. An emergency deceleration warning apparatus as in claim 2 further comprising a latching circuit for holding the warning signal, once activated even after the deceleration terminates, until the power to the Brake-Lights is removed, that comprises:

a diode with a positive side and a negative side that is connected between the output of the deceleration sensor and the Reverse-Lights line, where the positive side of the diode is connected to the deceleration sensor and the negative side is connected to the Reverse-Lights line;

a normally open relay with 4 contacts:

a first contact is an energize coil high voltage that is connected to the positive side of the diode;

a second contact is an energize coil low voltage that is connected to the power-source low voltage;

a third contact is a normally open arm of the relay that is connected to Brake-Lights line; and a fourth contact is a normally open arm of the relay that is connected to the positive side of the diode;

when applying voltage to the energize coil high voltage the relay is engaged and the third contact is connected to the fourth contact, and holds the warning signal until the power to the Brake-Lights line is removed.

4. An emergency deceleration warning apparatus as in claim 1 where the electric power-source is a direct connection to an electric battery, with high voltage side and a low voltage side, and further comprising:

a 1 G deceleration sensor adjusted to detect a forward deceleration above 1 G, by an angle of 35 to 90 degree up from the horizontal level, and pointing forward to the front end of the vehicle, having a high voltage input connected to the electric battery high voltage and an output;

a one-shot circuit of up to 30 seconds, connected to the electric battery high voltage and the electric battery low voltage, and has a trigger input line from the 1 G deceleration sensor output, and an output power line that is connected to an isolated power distribution relay that powers the Reverse-Lights line and the Brake-Lights line;

when the 1 G deceleration is subjected to a deceleration of 1 G or above, the 1 G deceleration sensor connects the high voltage input to the 1 G deceleration sensor output;

the 1 G deceleration output then triggers the one-shot circuit, that causes the one-shot output line to have high voltage that energizes the relay to provide power to the Reverse-Lights line and the Brake-Lights line, via two isolated power lines.

5. An emergency deceleration warning apparatus as in claim 4, where the isolated power distribution relay comprises:

a normally opened relay that when the relay is energized it connects the electric battery high voltage side to a positive side of two diodes, and the negative side of one diode is connected to the Brake-Lights line, and the negative side of the second diode is connected to the Reverse-Lights line, to isolate the two lines.

6. An emergency deceleration warning apparatus as in claim 4 where the isolated power distribution relay comprises:

a normally opened relay with two independent set of switching contacts, when the relay is energized, one switching set connects the electric battery high voltage side to the Brake-Lights line, and the other switching set connects the electric battery high voltage side to the Reverse-Lights line, to isolate the two lines.

7. A process of producing an emergency deceleration warning signal comprising of the following steps:

pressing a brake pedal to create a high rate of deceleration;

providing power to Brake-Lights line;

sensing the high rate of deceleration;

closing a contact to connect the power to the Brake-Lights line to a Reverse-Lights line while the high rate of deceleration is above 0.2 G, to produce an emergency deceleration signal;

closing a latch circuit to provide a parallel path from the Brake-Lights line to the Reverse-Light line to produce the emergency deceleration signal while the Break-Lights line has power even after the deceleration is below 0.2 G;

releasing the brake pedal;

eliminating the power to the Brake-Lights line;

releasing the latch circuit;

terminating the emergency deceleration warning signal.

8. A process of producing an emergency collision impact deceleration warning signal comprising of the following steps:

connecting an electric power-source to a 1 G deceleration sensor;

sensing a high rate of deceleration;

sending a signal to trigger a one-shot circuit of up to 30 second, when the 1 G deceleration sensor detects deceleration above 1 G;

maintaining a high voltage output from the one-shot for up to 30 seconds;

closing a normally opened relay or two normally opened relays for the duration of the high voltage output of the one-shot;

supplying two isolated powers from an electric power source: one to a Brake-Light line, and the other to a Reverse-Lights line of a vehicle, via the two normally opened relays, or using a single relay and two isolation diodes, one isolation diode is connected from the single relay to the Brake-Lights line, and the other isolation diode is connected from the single relay to the Reverse-Lights lines to produce the emergency collision impact deceleration warning signal.

* * * * *